United States Patent
Zhou et al.

(10) Patent No.: US 10,848,366 B2
(45) Date of Patent: Nov. 24, 2020

(54) NETWORK FUNCTION MANAGEMENT METHOD, MANAGEMENT UNIT, AND SYSTEM

(71) Applicant: HUAWEI TECHNOLOGIES CO., LTD., Guangdong (CN)

(72) Inventors: Yan Zhou, Shanghai (CN); Ruiyue Xu, Shanghai (CN); Li Ji, Berkshire (GB)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/411,623

(22) Filed: May 14, 2019

(65) Prior Publication Data

US 2019/0268213 A1 Aug. 29, 2019

Related U.S. Application Data

(63) Continuation of application No. PCT/CN2016/105923, filed on Nov. 15, 2016.

(51) Int. Cl.
*H04M 3/42* (2006.01)
*H04W 72/00* (2009.01)
(Continued)

(52) U.S. Cl.
CPC ........ *H04L 41/0246* (2013.01); *H04L 41/046* (2013.01); *H04L 41/32* (2013.01);
(Continued)

(58) Field of Classification Search
None
See application file for complete search history.

(56) References Cited

U.S. PATENT DOCUMENTS

| 2016/0156513 A1* | 6/2016 | Zhang | ........... H04L 41/00 |
| | | | 709/220 |
| 2017/0142591 A1* | 5/2017 | Vrzic | ........... H04W 24/08 |

(Continued)

FOREIGN PATENT DOCUMENTS

| CN | 105813195 A | 7/2016 |
| CN | 106060900 A | 10/2016 |
| EP | 2592789 A1 | 5/2013 |

OTHER PUBLICATIONS

"Interim agreements about shared network functions in network slicing," 3GPP Draft SA WG2, Sanya, P.R. China, S2-164702, XP051139251, pp. 1-2, 3rd Generation Partnership Project—Valbonne, France (Aug. 29-Sep. 2, 2016).

International Search Report dated May 2, 2017 in corresponding International Application No. PCT/CN2016/105923.

"Network Slicing Architecture and High-Level Function Definition," SA WG2 Meeting #114, Sophia Antipolis, France, S2-162008, pp. 1-6, 3rd Generation Partnership Project, Valbonne, France (Apr. 11-15, 2016).

(Continued)

*Primary Examiner* — Erika A Washington
(74) *Attorney, Agent, or Firm* — Leydig, Voit & Mayer, Ltd.

(57) ABSTRACT

Embodiments of the present invention relate to a network function management method, a management device, and a system. The method includes: obtaining, by a second management device, sharing information of a network function, where the sharing information of the network function is used to indicate whether the network function can be shared by at least two network slices; sending, by the second management device, the sharing information of the network function to a first management device; and orchestrating, by the first management device, the network function based on the sharing information of the network function. It can be learned from the above that the embodiments of the present invention provide a specific solution to choosing to provide a network slice with a shared network function or an exclusive network function, thereby facilitating network function maintenance and management.

20 Claims, 9 Drawing Sheets

(51) Int. Cl.
    *H04L 12/24*    (2006.01)
    *H04W 24/00*    (2009.01)
    *H04W 28/16*    (2009.01)
    *H04W 48/16*    (2009.01)
    *H04W 88/18*    (2009.01)
    *H04W 48/08*    (2009.01)
    *H04W 92/16*    (2009.01)

(52) U.S. Cl.
    CPC ......... *H04L 41/5054* (2013.01); *H04W 24/00* (2013.01); *H04W 28/16* (2013.01); *H04W 48/08* (2013.01); *H04W 48/16* (2013.01); *H04W 88/18* (2013.01); *H04W 92/16* (2013.01)

(56) References Cited

U.S. PATENT DOCUMENTS

2017/0332421 A1* 11/2017 Sternberg .............. H04W 76/11
2018/0324576 A1* 11/2018 Salkintzis ............. H04W 12/06

OTHER PUBLICATIONS

"Add requirements and update management use case for creating a network slice instance with common and slice specific CN functions and shared AN," 3GPP TSG SA WG5 (Telecom Management) Meeting #110, Reno (US), S5-166154, pp. 1-2, 3rd Generation Partnership Project, Valbonne, France (Nov. 14-18, 2016).

* cited by examiner

NETWORK FUNCTION MANAGEMENT METHOD, MANAGEMENT UNIT, AND SYSTEM

CROSS-REFERENCE TO RELATED APPLICATIONS

This application is a continuation of International Application No. PCT/CN2016/105923, filed on Nov. 15, 2016, the disclosure of which is hereby incorporated by reference in its entirety.

TECHNICAL FIELD

Embodiments of the present invention relate to the communications field, and in particular, to a network function management method, a management unit, and a system.

BACKGROUND

During research on a future mobile communications system, a concept of a network slice is introduced. The network slice may be understood as a network on demand. One physical network may be logically divided into a plurality of network slices, and different network slices may be used to bear different services. For example, when an electric power company needs to provide a service of a smart meter, such a service may be implemented by a network slice connected to a series of machine-to-machine (M2M) devices.

The network slice may include at least one network function. In practice, if one network function supports only one network slice, there may be excessive network functions, and it is inconvenient to maintain and manage the network functions.

SUMMARY

Embodiments of the present invention provide a network function management method, a management unit, and a system, to resolve a prior-art problem that it is inconvenient to manage a network function.

According to an aspect, an embodiment of the present invention provides a network function management method. The method includes: obtaining, by a second management unit, sharing information of a network function, where the sharing information of the network function is used to indicate whether the network function can be shared by at least two network slices; sending, by the second management unit, the sharing information of the network function to a first management unit; and orchestrating, by the first management unit, the network function based on the sharing information of the network function.

In this embodiment of the present invention, the first management unit receives the sharing information of the network function from the second management unit, where the sharing information of the network function is used to indicate whether the network function can be shared by at least two network slices; and the first management unit orchestrates the network function based on the sharing information of the network function. In this way, a specific solution to choosing to provide a network slice with a shared network function or an exclusive network function is provided, thereby facilitating network function maintenance and management.

In a possible design, the first management unit may send a query request message to the second management unit, where the query request message is used to request the sharing information of the network function; and then the first management unit receives a query response message from the second management unit, where the query response message carries the sharing information of the network function. According to the solution in this embodiment of the present invention, a specific manner of querying the sharing information of the network function from the second management unit by the first management unit is provided, thereby helping the first management unit obtain the sharing information of the network function at any time based on a need.

In a possible implementation, the query request message may carry an identifier of the network function, an identifier of a network function descriptor, or requirement information of the network function, and the second management unit may obtain the sharing information of the network function based on the identifier of the network function, the identifier of the network function descriptor, or the requirement information of the network function. According to the solution in this embodiment of the present invention, a specific type of information carried in the query request message is provided, thereby helping the second management unit obtain the sharing information of the network function based on the foregoing information.

In a possible design, the first management unit may send a network function instantiation request message to the second management unit; and then the first management unit receives a network function instantiation response message from the second management unit, where the network function instantiation response message carries the sharing information of the network function. According to the solution in this embodiment of the present invention, a specific manner of obtaining the sharing information of the network function from the second management unit by the first management unit is provided. When requesting the second management unit to instantiate the network function, the first management unit obtains the sharing information of the network function that is sent by the second management unit. Because the sharing information of the network function is carried in an existing network function instantiation response message, management is facilitated.

In a possible design, when the sharing information of the network function indicates that the network function can be shared by at least two network slices, the first management unit may select the network function to constitute at least one network slice; or when the sharing information of the network function indicates that the network function cannot be shared by at least two network slices, the first management unit may select the network function to constitute one network slice. According to the solution in this embodiment of the present invention, a specific manner of orchestrating the network function based on the sharing information of the network function by the first management unit is provided. The sharing information of the network function provides a basis for the first management unit to select a network function when the first management unit creates a network slice.

In a possible design, the network function may include a network function module, the second management unit may obtain sharing information of the network function module, and then the first management unit may receive the sharing information of the network function module from the second management unit, where the sharing information of the network function module is used to indicate whether the network function module can be shared by at least two network slices. In this embodiment of the present invention, the first management unit can receive the sharing information of the network function module from the second management unit, so that the first management unit may select the network function module for a network slice based on the sharing information of the network function module.

In a possible design, before the first management unit orchestrates the network function based on the sharing information of the network function, the first management unit may further receive a network slice creation request message or a network slice update request message, where a network slice that the network slice creation request message requests to create or a network slice that the network slice update request message requests to update includes the network function. According to the solution in this embodiment of the present invention, a condition for triggering the first management unit to orchestrate the network function is provided. In other words, in the solution in this embodiment of the present invention, network function orchestration can be combined into a network slice management process.

In a possible design, the sharing information of the network function may include at least one of the following: sharing indication information of the network function, key performance indicator (KPI) information of the network function, or sharing condition information of the network function. According to the solution in this embodiment of the present invention, a specific type of the sharing information of the network function is provided. The sharing information of the network function may be the sharing indication information of the network function, in other words, an indication indicating whether the network function can be shared by at least two network slices is directly provided. Alternatively, the sharing information of the network function may be the KPI information of the network function or the sharing condition information of the network function, so that whether the network function can be shared by at least two network slices may be indirectly determined based on the KPI information of the network function or the sharing condition information of the network function.

According to another aspect, an embodiment of the present invention provides a first management unit. As a network function management apparatus, the first management unit may implement functions performed by the first management unit in the foregoing method designs. The functions may be implemented by hardware or may be implemented by executing corresponding software by hardware. The hardware or the software includes one or more modules corresponding to the foregoing functions.

In a possible design, the first management unit includes a processor and a communications interface. The processor is configured to support the first management unit in performing corresponding functions in the foregoing method. The communications interface is configured to support communication between the first management unit and a second management unit or another unit. The first management unit may further include a memory. The memory is configured to couple to the processor. The memory stores a program instruction and data that are necessary for the first management unit.

According to still another aspect, an embodiment of the present invention provides a second management unit. As another network function management apparatus, the second management unit may implement functions performed by the second management unit in the foregoing method designs. The functions may be implemented by hardware or may be implemented by executing corresponding software by hardware. The hardware or the software includes one or more modules corresponding to the foregoing functions.

In a possible design, the second management unit includes a processor and a communications interface. The processor is configured to support the second management unit in performing corresponding functions in the foregoing method. The communications interface is configured to support communication between the second management unit and a first management unit or another unit. The second management unit may further include a memory. The memory is configured to couple to the processor. The memory stores a program instruction and data that are necessary for the second management unit.

According to yet another aspect, an embodiment of the present invention provides a communications system. The system includes the first management unit and the second management unit in the foregoing aspects.

According to still yet another aspect, an embodiment of the present invention provides a computer storage medium. The computer storage medium is configured to store a computer software instruction used by the foregoing first management unit, and includes a program designed for executing the foregoing aspect.

According to a further aspect, an embodiment of the present invention provides a computer storage medium. The computer storage medium is configured to store a computer software instruction used by the foregoing second management unit, and includes a program designed for executing the foregoing aspect.

According to a still further aspect, an embodiment of the present invention provides a computer program product. The computer program product includes an instruction. When the instruction is executed by a computer, the instruction enables the computer to perform functions performed by the first management unit in the foregoing method designs.

According to a yet further aspect, an embodiment of the present invention provides a computer program product. The computer program product includes an instruction. When the instruction is executed by a computer, the instruction enables the computer to perform functions performed by the second management unit in the foregoing method designs.

In comparison with the prior art, in the solutions provided in the embodiments of the present invention, the first management unit receives the sharing information of the network function from the second management unit, where the sharing information of the network function is used to indicate whether the network function can be shared by a plurality of network slices; and the first management unit orchestrates the network function based on the sharing information of the network function. In this way, a specific solution to choosing to provide a network slice with a shared network function or an exclusive network function is provided.

DESCRIPTION OF EMBODIMENTS

The following describes the technical solutions in embodiments of the present invention with reference to the accompanying drawings in the embodiments of the present invention.

Network architectures and business scenarios described in the embodiments of the present invention are intended to more clearly describe the technical solutions in the embodiments of the present invention, but are not intended to limit the technical solutions provided in the embodiments of the present invention. A person of ordinary skill in the art may know that as the network architectures evolve and a new business scenario emerges, the technical solutions provided in the embodiments of the present invention are further applicable to a similar technical problem.

Figure 1:
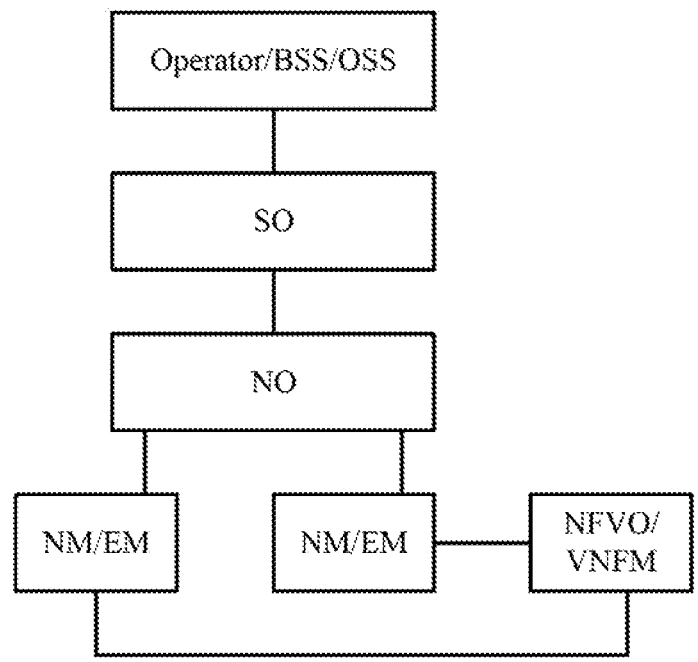
FIG. 1 is a schematic diagram of a possible network architecture according to an embodiment of the present invention.

A possible network architecture applicable to the embodiments of the present invention is first described below with reference to FIG. 1. FIG. 1 shows a possible network architecture according to an embodiment of the present invention. As shown in FIG. 1, the network architecture includes: a service orchestrator (SO) unit, a network orchestrator (NO) unit, an operations support system (OSS), a network manager (NM) unit, and a network functions virtualization orchestrator (NFVO) unit.

The OSS may be replaced with a business support system (Business Support System, BSS) or an operator. Alternatively, in addition to a function of the OSS, the OSS may further have a function of a BSS and/or a function of an operator. "Operator/BSS/OSS" in FIG. 1 indicates a unit having at least one of a function of an operator, a function of a BSS, or a function of an OSS. The unit may alternatively have another name. This is not limited in the embodiments of the present invention.

The NM unit may be replaced with an element manager (EM) unit. Alternatively, in addition to a function of the NM unit, the NM unit may further have a function of an EM unit. "EM/NM" in FIG. 1 indicates a unit having a function of an EM and/or a function of an NM. The unit may alternatively have another name. This is not limited in the embodiments of the present invention.

The NFVO unit may be understood as a network function manager (NFM) unit. The NFVO unit may be replaced with a virtualized network function manager (VNFM) unit. Alternatively, in addition to a function of the NFVO unit, the NFVO unit may further have a function of a VNFM unit. "NFVO/VNFM" in FIG. 1 indicates a unit having a function of an NFVO unit and/or a function of a VNFM unit. The unit may alternatively have another name. This is not limited in the embodiments of the present invention.

Units in FIG. 1 are briefly described below:

The operator/BSS/OSS indicates an operations support system or a business and service support system. A function of the operator/BSS/OSS may include a function of an SO unit and/or a function of an NO unit.

The SO unit may also be referred to as a service orchestrator and manager unit or a service manager unit. The SO unit mainly includes the following functions: service lifecycle management (for example, instantiation, update, or deletion) performed based on a service request message; Service Aggregation; service management, for example, service Fault, Configuration, Accounting, Performance, Security (FCAPS) management; mapping between a service and a network slice; and the like. The service may be a group of specified service level agreement (SLA) communications services that are available to a user, for example, a mobile broadband (MBB) service, a voice service, and an Internet of Things (IOT) service (for example, intelligent parking or smart metering). For example, the SO unit may manage a service borne by a network slice.

The NO unit mainly includes the following functions: network slice management, for example, network slice lifecycle management, and network slice template management; mapping between a network slice and a network function; coordination between different types of network resources; coordination between network resources provided by different operators and different network providers, to enable the network resources provided by the different network providers to meet a requirement of a target service, for example, an SLA requirement, a key performance indicator (KPI) requirement, or a quality of service (QoS) requirement; uniform orchestration of network devices provided by different providers; and external provisioning of an application programming interface (API), where the API interface is used to provide a network function for a third party to implement inter-operator deployment.

In the embodiments of the present invention, the SO unit and the NO unit may be located in a same management entity (for example, a BSS/OSS), or the SO unit and the NO unit may be independent entities.

The EM/NM unit mainly includes the following functions: network element lifecycle management (for example, instantiation, update, or deletion), network element FCAPS management, and the like.

The NFVO unit is mainly responsible for managing and orchestrating infrastructure and a virtualized network function (VNF), to implement complete network service orchestration. The NFVO unit is a type of virtualized orchestrator unit. The virtualized orchestrator unit may alternatively be a resource orchestrator (RO) unit, a network service orchestrator unit, or another unit.

The VNFM unit is mainly responsible for managing a lifecycle of a VNF and monitoring resource utilization of the VNF. For example, the VNFM unit may include the following functions: VNF instantiation, addition, deletion, change, query, scale-out/scale-in, and reservation, and dynamic monitoring of a resource occupied by a VNF.

For ease of description, a unit may be described below merely by using an English abbreviation of the unit. For example, "SO unit" may be described as "SO". Other units are similar to this. Details are not described subsequently.

The embodiments of the present invention are further described below in detail based on common aspects of the embodiments of the present invention described above.

To facilitate network function maintenance and management, the embodiments of the present invention provide a network function management method, and a management unit and a system that are based on this method. The method includes: obtaining, by a second management unit, sharing information of a network function, where the sharing information of the network function is used to indicate whether the network function can be shared by at least two network slices; sending, by the second management unit, the sharing information of the network function to a first management unit; and orchestrating, by the first management unit, the network function based on the sharing information of the network function. In the solutions in the embodiments of the present invention, before orchestrating the network function, the first management unit can obtain the sharing information of the network function, so that the first management unit can learn whether the network function can be shared by at least two network slices, and then orchestrate the network function. In this way, network function maintenance and management are facilitated.

The network function management method provided in the embodiments of the present invention and some concepts related to the method are briefly described below.

In the embodiments of the present invention, a sharing parameter may be introduced at a network function (NF) instance level and an instance module level. NF instance information includes a sharing parameter of an NF. The sharing parameter of the NF is used to define whether the network function can be concurrently used by at least two network slices. A sharing parameter of a network function module is used to define whether the network function module can be concurrently used by at least two network slices. The NF includes a virtualized network function and a physical network function. In the embodiments of the present invention, a sharing parameter may be further introduced at an NF descriptor level and a module descriptor level, for example, may be specifically set in a function entity deployment and maintenance template or descriptor.

The template may mean any one of an NF descriptor, NF module descriptor, a link descriptor, and a node descriptor. The template may be set in a deployment flavor, or may be set in an attribute of a root directory, or may be set in a network function module profile, a link profile, or a node profile. Network functions are connected through a link, and a node is a contact between a link and a network function.

In the embodiments of the present invention, a rule for determining whether sharing is allowed, to be specific, a rule for determining whether this type of NF instance can further be used in a new slice, may be set. For example, a maximum quantity of slices that can share a function entity may be statically set, or a rule for determining whether sharing is allowed may be dynamically set to detect a parameter of a function entity instance. The parameter may include a virtual-resource performance parameter and/or an application performance parameter. The virtual-resource performance parameter includes at least one of the following: a central processing unit (CPU) usage, a storage usage, a network bandwidth usage, and the like. The application performance parameter includes at least one of the following: an SLA performance parameter, an access success rate, an attachment rate, and the like. In addition, a parameter calculation rule may be further set to specify an integrated algorithm between parameters, to determine an integrated assessment parameter, and whether the network function is to be shared is determined based on the integrated assessment parameter by using the rule for determining whether sharing is allowed that is dynamically set.

The solutions in the embodiments of the present invention are further described below with reference to FIG. 2 to FIG. 6. The network architecture shown in FIG. 1 may be applied to FIG. 2 to FIG. 6. The solutions in the embodiments of the present invention are described by using an example in which a first management unit is the NO and a second management unit is the NFM.

Figure 2:
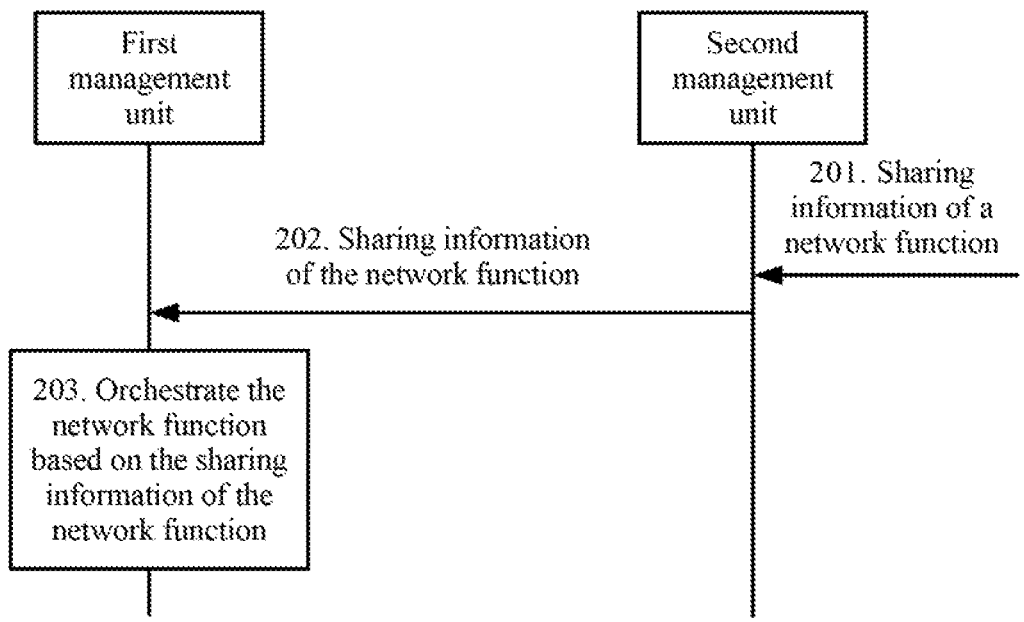
FIG. 2 is a schematic communication diagram of a network function management method according to an embodiment of the present invention.

FIG. 2 is a schematic communication diagram of a network function management method according to an embodiment of the present invention. Referring to FIG. 2, the method includes the following steps.

Step 201: A second management unit obtains sharing information of a network function.

The sharing information of the network function is used to indicate whether the network function can be shared by at least two network slices.

In an example, the second management unit may obtain the sharing information of the network function from a catalog. Optionally, the catalog may be disposed in the second management unit, or may be disposed in a third management unit independent of the second management unit. Therefore, the second management unit may locally obtain the sharing information of the network function or may receive the sharing information of the network function from the third management unit.

In an example, before obtaining the sharing information of the network function, the second management unit may further receive a query request message from a first management unit. The query request message is used to request the sharing information of the network function.

Optionally, the query request message may carry an identifier of the network function, an identifier of a network function descriptor, or requirement information of the network function, and the identifier of the network function, the identifier of the network function descriptor, or the requirement information of the network function may be used by the second management unit to obtain the sharing information of the network function. Correspondingly, the second management unit may obtain the sharing information of the network function based on the identifier of the network function, the identifier of the network function descriptor, or the requirement information of the network function. The requirement information of the network function may be specifically a type, a function, or the like of the network function.

In another example, before obtaining the sharing information of the network function, the second management unit may further receive a network function instantiation request message from the first management unit.

In this embodiment of the present invention, the sharing information of the network function may have a plurality of forms. For example, the sharing information of the network function may include at least one of the following: sharing indication information of the network function, KPI information of the network function, or sharing condition information of the network function.

Step 202: The second management unit sends the sharing information of the network function to a first management unit.

In an example, the network function may indicate a specific type of network function, and the second management unit may send the sharing information of the network function and the identifier of the network function descriptor to the first management unit, to indicate that all network function instances obtained through instantiation based on the network function descriptor can be shared or cannot be shared. Alternatively, the network function may indicate a specific network function instance, and the second management unit may send the sharing information of the network function and an identifier of the network function instance to the first management unit, to indicate whether the network function instance can be shared. After receiving the sharing information of the network function from the second management unit, the first management unit may orchestrate the specific type of network function or the specific network function instance based on the information.

In an example, if the second management unit receives the query request message from the first management unit, the second management unit may send a query response message to the first management unit. The query response message carries the sharing information of the network function.

In another example, if the second management unit receives the network function instantiation request message from the first management unit, the second management unit may send a network function instantiation response message to the first management unit. The network function instantiation response message carries the sharing information of the network function.

Step 203: The first management unit orchestrates the network function based on the sharing information of the network function.

In an example, when the sharing information of the network function indicates that the network function can be shared by at least two network slices, the first management unit may select the network function to constitute at least one network slice; or when the sharing information of the network function indicates that the network function cannot be shared by at least two network slices, the first management unit may select the network function to constitute one network slice.

In an example, the first management unit may orchestrate the network function in a network slice creation or update process. For example, before orchestrating the network function, the first management unit may further receive a network slice creation request message or a network slice update request message. A network slice that the network slice creation request message requests to create or a network slice that the network slice update request message requests to update includes the network function.

This embodiment of the present invention provides a network function management method. The first management unit receives the sharing information of the network function from the second management unit, where the sharing information of the network function is used to indicate whether the network function can be shared by at least two network slices; and the first management unit orchestrates the network function based on the sharing information of the network function. In this way, a specific solution to choosing to provide a network slice with a shared network function or an exclusive network function is provided, thereby facilitating network function maintenance and management.

In some possible implementations, the network function may include a network function module. In this embodiment of the present invention, a network function module management method may be further provided based on the manner shown in FIG. 2. For example, the management method may include the following: The second management unit obtains sharing information of the network function module; then the second management unit sends the sharing information of the network function module to the first management unit, where the sharing information of the network function module is used to indicate whether the network function module can be shared by at least two network slices; and after receiving the sharing information of the network function module, the first management unit orchestrates the network function module based on the sharing information of the network function module. A behavior of obtaining the sharing information of the network function module by the second management unit may be performed in step 201; the sharing information of the network function module may be sent to the first management unit by the second management unit in step 202; and in step 203, when orchestrating the network function based on the sharing information of the network function, the first management unit may further orchestrate the network function module based on the sharing information of the network function module. Certainly, all steps in the network function module management method may have other implementations or implementation timing. This is not limited in this embodiment of the present invention.

Figure 3A:
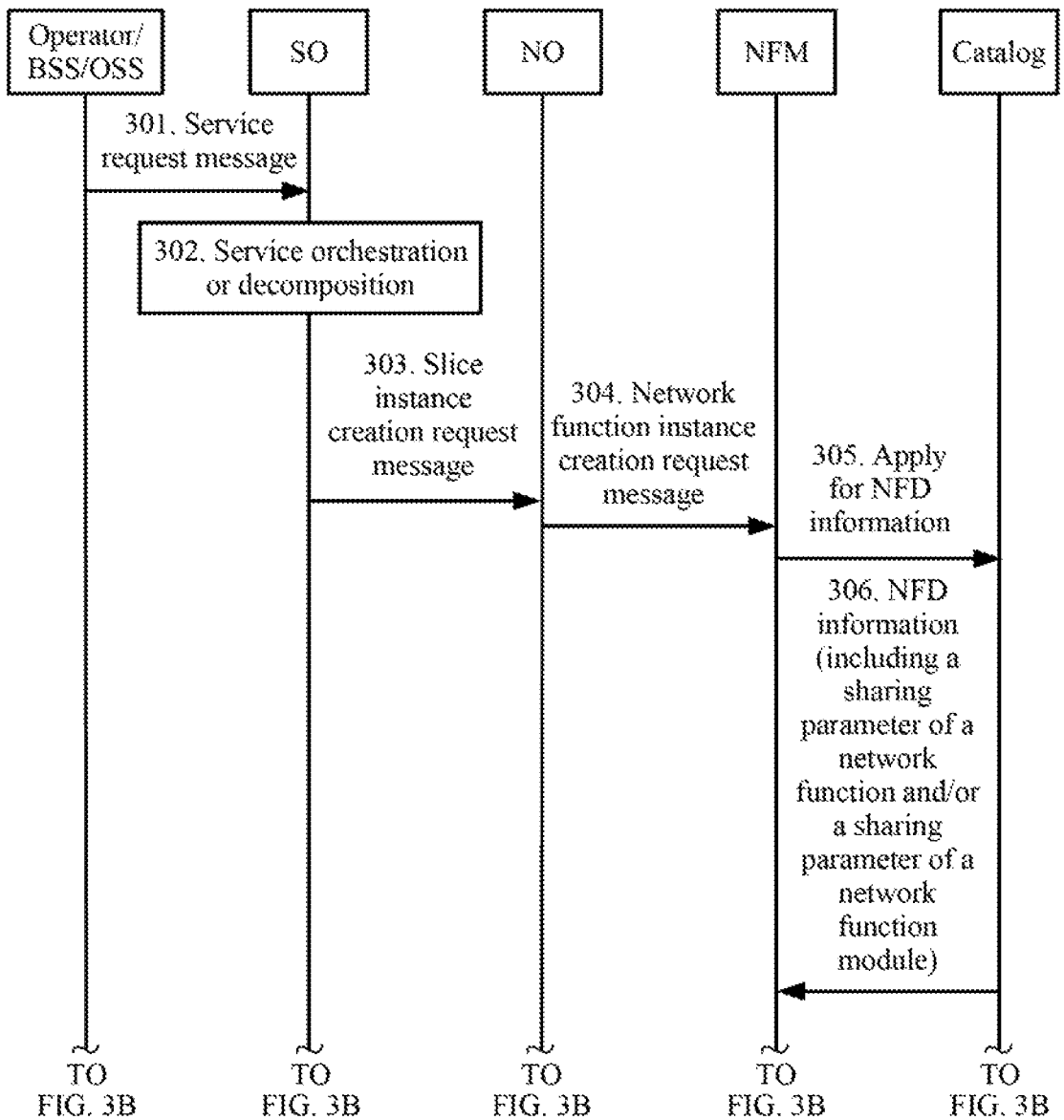
FIG. 3A and FIG. 3B are a schematic communication diagram of another network function management method according to an embodiment of the present invention.
Figure 3B:
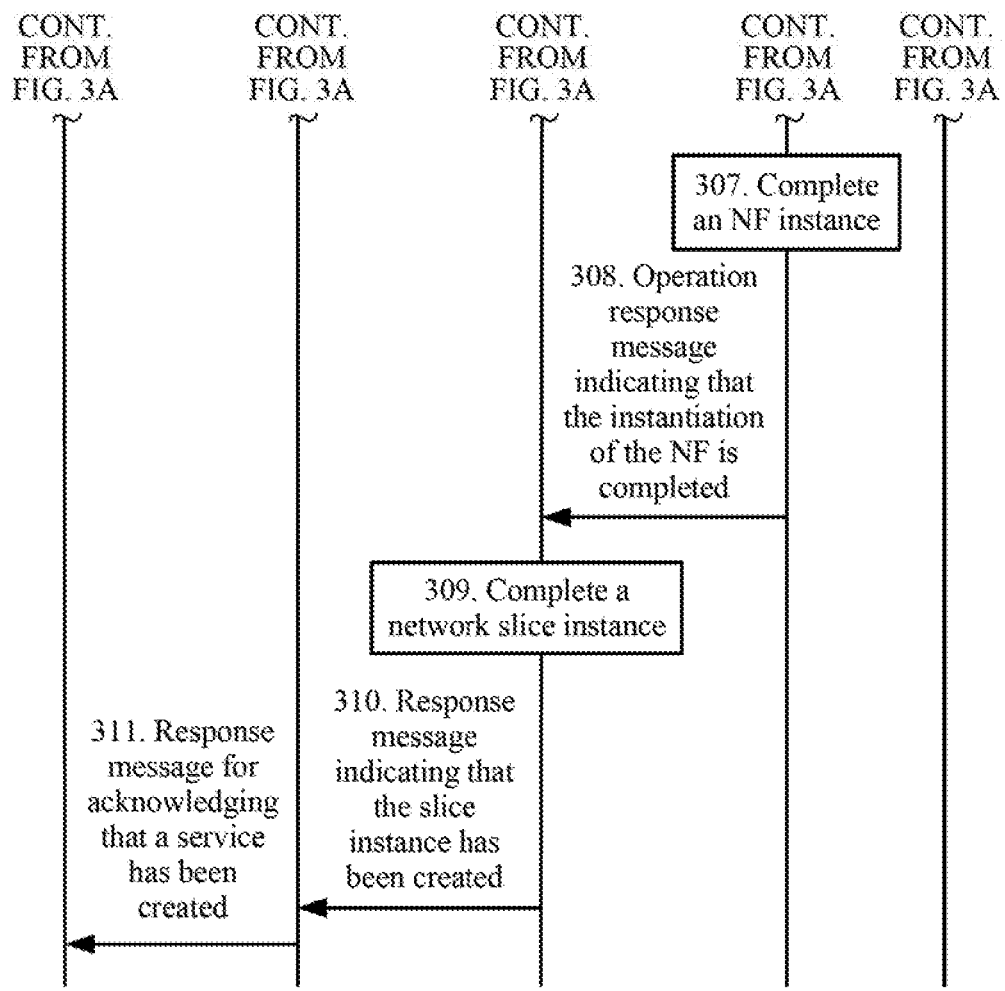

FIG. 3A and FIG. 3B are a schematic communication diagram of another network function management method according to an embodiment of the present invention. In the method shown in FIG. 3A and FIG. 3B, for content the same as or similar to that of the method shown in FIG. 2, refer to the detailed description of FIG. 2. Details are not described herein again. A description is provided below by using an example: a scenario in which an NO creates a network slice. An operator/BSS/OSS, an SO, and the NO herein each may be an entity or may be mutually independent entities. An entity that requests to create a network slice may be the NO, the SO, or the operator/BSS/OSS. Referring to FIG. 3A and FIG. 3B, the method includes the following steps.

Step 301: The operator/BSS/OSS sends a service request message to the SO.

For example, the service request message is used to request a service, for example, a military network service as a dedicated network service.

Step 302: The SO aggregates or decomposes a service.

In an example, the SO may decompose the service into a specific voice service and a real-time data service.

Step 303: The SO sends a slice instance creation request message to the NO.

In an example, the slice instance creation request message is used to request to separately create one voice slice and one data slice.

Step 304: After receiving the slice instance creation request message, the NO sends a network function instance creation request message to an NFM.

The network function instance creation request message may carry an identifier of a network function.

Step 305: The NFM applies to a catalog for network function descriptor (NFD) information based on a carried identifier of a network function.

Step 306: The catalog feeds back corresponding network function descriptor information.

The network function descriptor information may include a sharing parameter of a network function, and may further include a sharing parameter of a specific network function module of an instantiated network function.

In an example, the network function module includes but is not limited to a network function module, a link, or a node; the parameter may be set to any one of a root directory of a network function, a network function module descriptor, a link descriptor, or a node descriptor, or may be set in a deployment flavor, or may be set in an attribute of a root directory, or may be set in a network function module profile, a link profile, or a node profile. Alternatively, the parameter may be a rule for determining whether sharing is allowed, including a rule algorithm, a monitoring parameter, a threshold value, or the like.

In this step, the catalog may be a function module located in the NFM, and in this case, querying the catalog by the NFM is an internal operation in an entity.

For a high SLA requirement in a dedicated network, an exclusive attribute is set in the specific network function module, and sharing is allowed in a public module with higher reliability. For example, the exclusive attribute is set for an interface, a service processing module, and a corresponding link and node, to ensure high reliability, high performance, and the like during operating of the module; and a maintenance and management module is set to shareable.

Step 307: The NFM completes instantiation of an NF based on a sharing parameter of a network function and/or a sharing parameter of a network function module.

Step 308: The NFM sends, to the NO, an operation response message indicating that the instantiation of the NF is completed.

The operation response message may carry sharing information of the NF. The sharing information may include the sharing parameter of the network function and/or the sharing parameter of the network function module, or a rule algorithm, a monitoring parameter, a threshold value, or the like.

Step 309: The NO determines, based on sharing information of the NF that is provided by the NFM, the NF used when a slice is generated, and creates the network slice.

For example, when the sharing information of the NF indicates that the NF can be shared by at least two network slices, a corresponding NF may be selected and used for a plurality of network slices. For example, if the NF that can be shared is currently serving one network slice, the NO may alternatively select the NF to serve a network slice that is currently being created.

Step 310: After the NO completes the creation of the network slice, the NO sends, to the SO, a response message indicating that a slice instance has been created.

Step 311: The SO sends, to the operator/BSS/OSS, a response message for acknowledging that a service has been created.

In this embodiment of the present invention, deployment of a virtualized network function is instructed based on the network function descriptor, to invoke a shareable attribute, and a shareable attribute of the network function and a shareable attribute of a module of the network function are considered during the creation of the network slice instance. In this way, network function operation, maintenance, and management are facilitated.

Figure 4A:
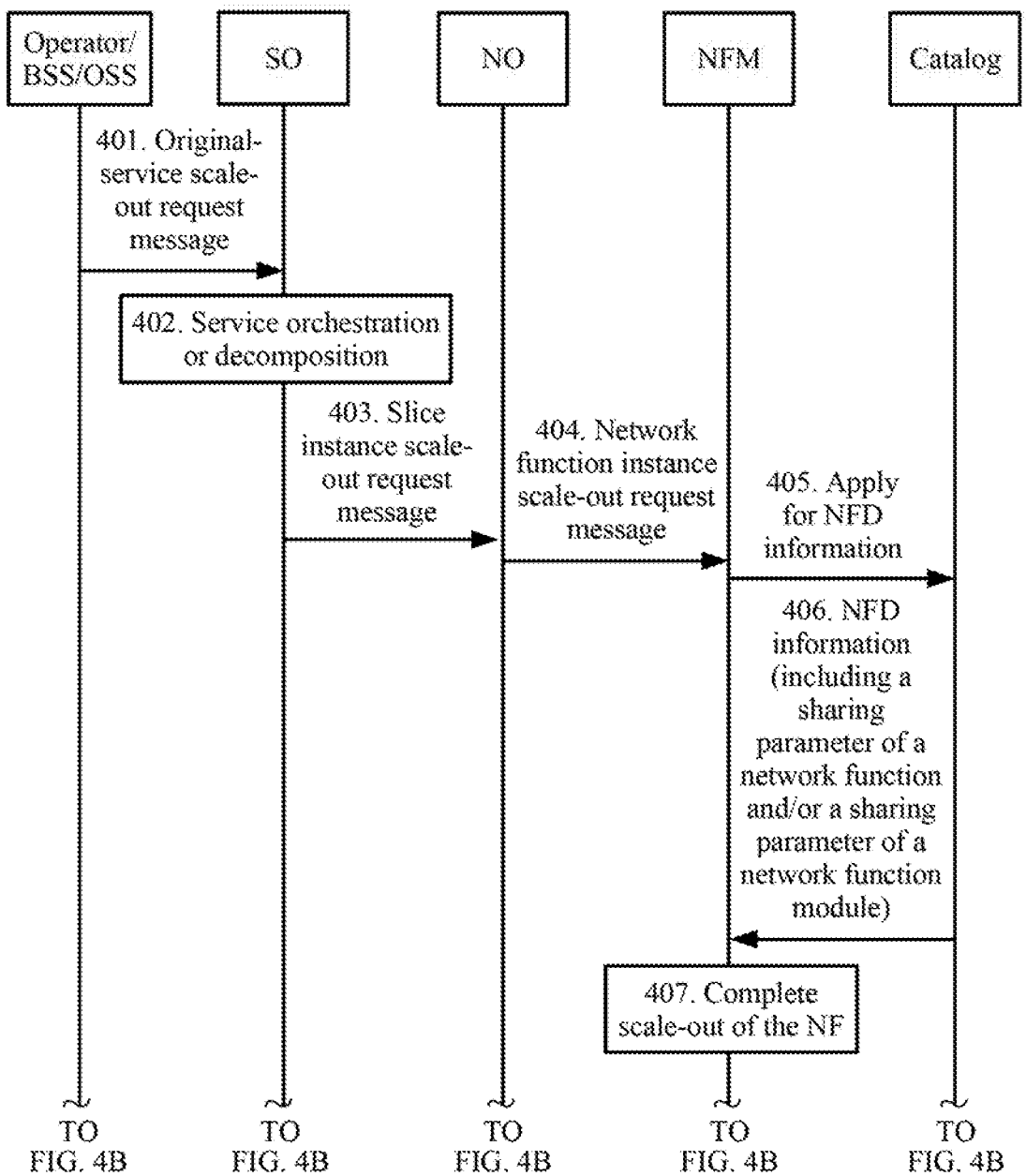
FIG. 4A and FIG. 4B are a schematic communication diagram of still another network function management method according to an embodiment of the present invention.
Figure 4B:
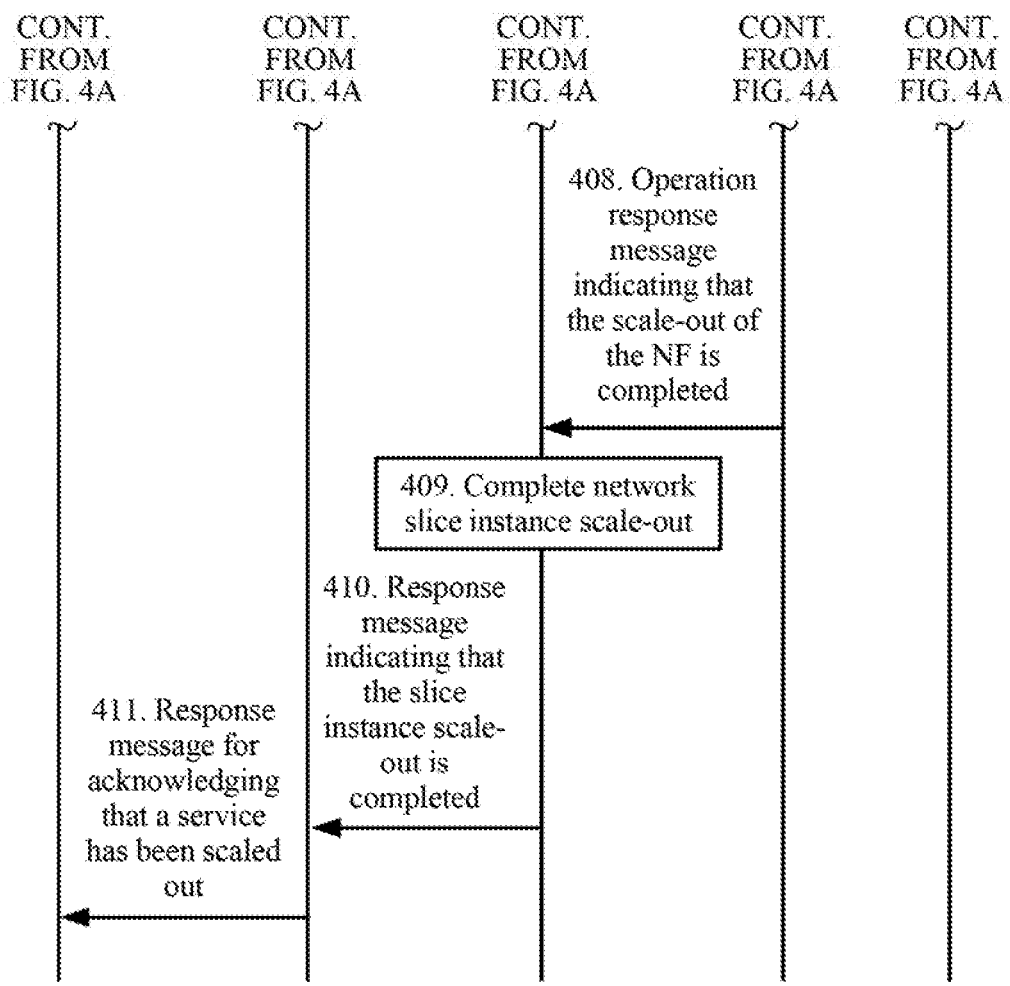

FIG. 4A and FIG. 4B are a schematic communication diagram of still another network function management method according to an embodiment of the present invention. In the method shown in FIG. 4A and FIG. 4B, for content the same as or similar to that of the method shown in FIG. 2 or FIG. 3A and FIG. 3B, refer to the detailed description of FIG. 2 or FIG. 3A and FIG. 3B. Details are not described herein again. A description is provided below by using an example in which an NO scales out a network slice. An operator/BSS/OSS, an SO, and the NO herein each may be an entity or may be mutually independent entities. An entity that requests to scale out a network slice may be the NO, the SO, or the operator/BSS/OSS. Referring to FIG. 4A and FIG. 4B, the method includes the following steps.

Step 401: The operator/BSS/OSS sends an original-service scale-out request message to the SO.

The request message is used to scale out a service or a business, for example, scale out a smart-meter monitoring service.

Step 402: The SO aggregates a service or decomposes a service into corresponding services.

Step 403: The SO sends a slice instance scale-out request message to the NO.

The service determined in step 402 is borne by a network slice.

Step 404: After receiving the slice instance scale-out request message, the NO sends a network function instance scale-out request message to an NFM.

The network function instance scale-out request message may carry an identifier of a network function.

Step 405: The NFM applies to a catalog for network function descriptor information based on a carried identifier of a network function.

Step 406: The catalog feeds back corresponding network function descriptor information, where the network function descriptor information includes a sharing parameter of a network function that needs to be scaled out and/or a sharing parameter of a specific network function module of the network function.

For a description related to the network function module, refer to detailed content in step 306 in FIG. 3A. Details are not described herein again.

In this step, the catalog may be a function module located in the NFM, and in this case, querying the catalog by the NFM is an internal operation in an entity.

For a service that has a non-real-time and low-rate requirement, a shareable network function module is provided.

Step 407: The NFM completes scale-out of the NF based on the sharing parameter of the network function and/or the sharing parameter of the network function module.

Step 408: The NFM sends, to the NO, an operation response message indicating that the scale-out of the NF is completed.

In an NF scale-out process, a new network function module may need to be used. In this case, whether the network function module can be shared may be considered as in the instantiation process.

Step 409: The NO completes network slice instance scale-out.

Step 410: The NO sends, to the SO, a response message indicating that the slice instance scale-out is completed.

Step 411: The SO sends, to the operator/BSS/OSS, a response message for acknowledging that a service has been scaled out.

In this embodiment of the present invention, deployment of a virtualized network function is instructed by using the network function descriptor, to invoke a shareable attribute, and a shareable attribute of the network function and a shareable attribute of a module of the network function are considered during the scale-out and update of the network slice instance. In this way, network function operation, maintenance, and management are facilitated.

Figure 5:
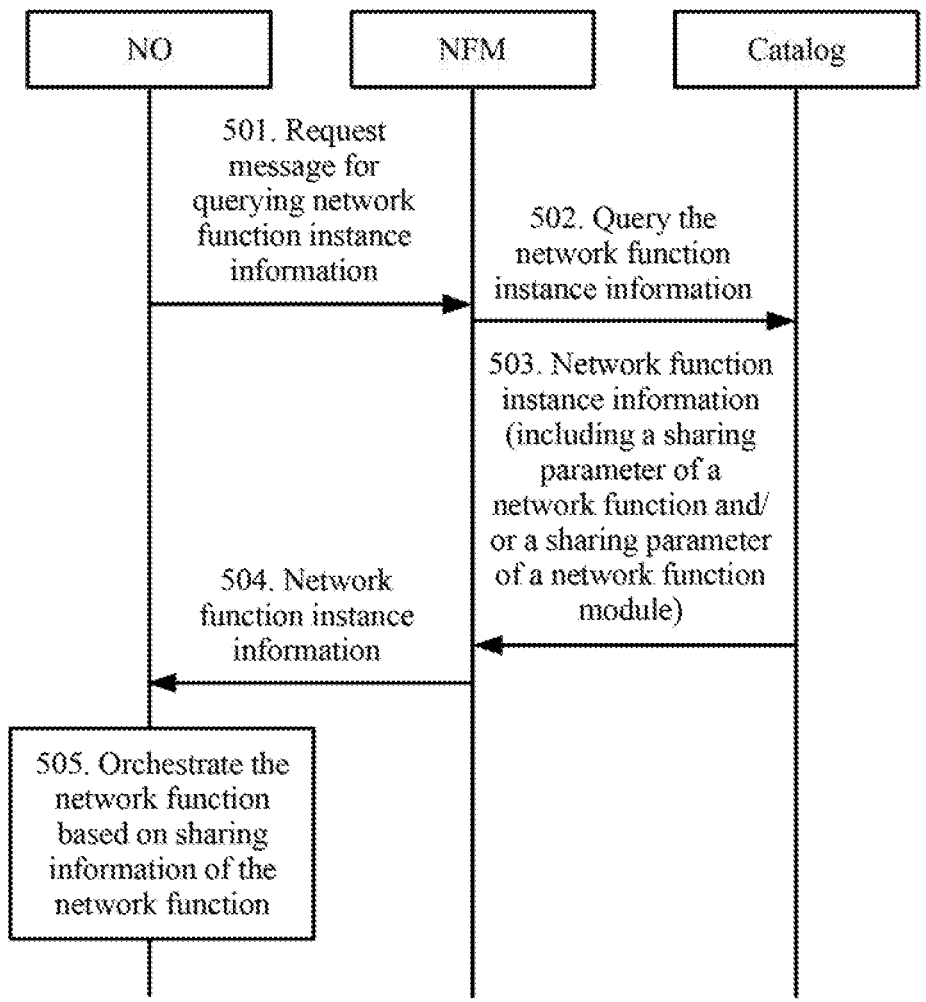
FIG. 5 is a schematic communication diagram of yet another network function management method according to an embodiment of the present invention.

FIG. 5 is a schematic communication diagram of yet another network function management method according to an embodiment of the present invention. In the method shown in FIG. 5, for content the same as or similar to that of the method shown in FIG. 2, FIG. 3A and FIG. 3B, or FIG. 4A and FIG. 4B, refer to the detailed description of FIG. 2, FIG. 3A and FIG. 3B, or FIG. 4A and FIG. 4B. Details are not described herein again. In the method shown in FIG. 5, an entity querying network function instance information may be an NO, an SO, or an operator/BSS/OSS.

This embodiment of the present invention is described merely by using the NO as an example. Referring to FIG. 5, the method includes the following steps.

Step 501: The NO sends a request message for querying network function instance information to an NFM.

The request message may be used to query all the instance information, or query sharing parameter information of a network function and/or sharing parameter information of a network function module according to a specified requirement.

Step 502: The NFM queries a catalog for the network function instance information.

The catalog may be a module in the NFM, and in this case, the NFM needs to perform only internal query.

Step 503: The catalog returns the network function instance information to the NFM, including a sharing parameter of a network function and/or a sharing parameter of a specific network function module.

The network function instance information may further carry a rule indicating whether sharing is to be performed and a monitoring status of the instance, for example, a threshold value, a calculation formula, or a monitoring parameter. For example, a network slice instance of a high SLA is queried, a service module is exclusive, and a public maintenance module can be shared. A rule for limiting sharing of the shareable module is that sharing is no longer allowed when a CPU usage exceeds a threshold value: 60%.

Step 504: The NFM sends the network function instance information to the NO, where the network function instance information includes the sharing parameter of the network function and/or the sharing parameter of the network function module.

The sharing parameter of the network function and/or the sharing parameter of the network function module may be collectively referred to as sharing information of the network function.

In this step, the catalog may be a function module located in the NFM, and in this case, querying the catalog by the NFM is an internal operation in an entity.

Step 505: The NO orchestrates the network function based on sharing information of the network function.

For example, during network slice instantiation, a network function is selected based on whether the network function can be shared.

In this embodiment of the present invention, the sharing parameter of the network function and/or the sharing parameter of the network function module is reflected in the network function instance information, so that the network function may be orchestrated by querying the network function instance information.

Figure 6:
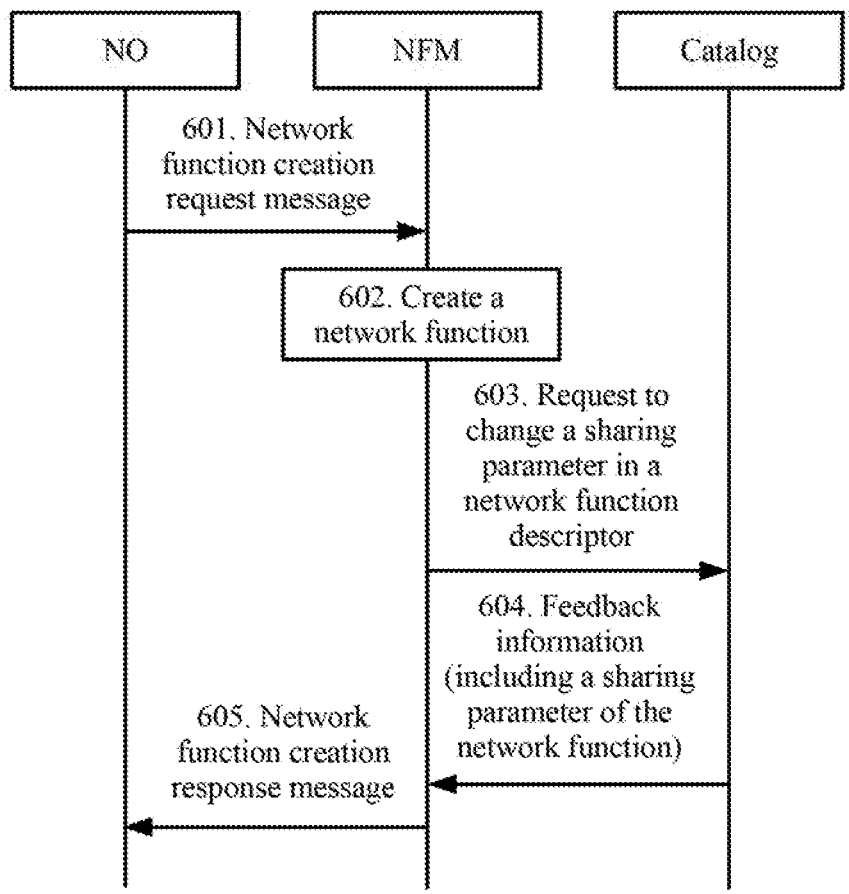
FIG. 6 is a schematic communication diagram of still yet another network function management method according to an embodiment of the present invention.

FIG. 6 is a schematic communication diagram of still yet another network function management method according to an embodiment of the present invention. In the method shown in FIG. 6, for content the same as or similar to that of the method shown in FIG. 2, FIG. 3A and FIG. 3B, FIG. 4A and FIG. 4B, or FIG. 5, refer to the detailed description of FIG. 2, FIG. 3A and FIG. 3B, FIG. 4A and FIG. 4B, or FIG. 5. Details are not described herein again. In the method shown in FIG. 6, an entity changing a sharing parameter in a network function descriptor may be an NO, an SO, or an operator/BSS/OSS. This embodiment of the present invention is described merely by using the NO as an example. Referring to FIG. 6, the method includes the following steps.

Step 601: The NO sends an NF creation request message to an NFM, where the request message includes a requirement for changing a sharing parameter in an NF descriptor.

The request message may further include information such as a template used to generate an NF.

Step 602: The NFM generates an NF based on the request message of the NO.

Step 603: The NFM requests a catalog to change the sharing parameter in the NF descriptor.

Step 604: The catalog sends feedback information to the NFM, including a sharing parameter of the NF.

In this step, the catalog may be a function module located in the NFM, and in this case, querying the catalog by the NFM is an internal operation in an entity.

Step 605: The NFM sends an NF creation response message to the NO.

The NF creation response message may include the sharing parameter of the NF. The NO orchestrates the network function based on the sharing parameter of the network function, for example, during network slice instantiation, selects the network function based on whether the network function can be shared.

In this embodiment of the present invention, the sharing parameter in the network function descriptor may be configured, changed, or updated, and therefore, network function management becomes more flexible.

In this embodiment of the present invention, a manner of obtaining the sharing parameter is flexible and diverse. NF instance information includes the sharing parameter of the NF. The sharing parameter of the NF is used to indicate whether this entity instance can be used by a plurality of slice instances. The NF descriptor includes a sharing parameter of an entity that indicates whether an entity instance generated by this type of entity can be used by a plurality of slice instances. The entity may be any one of the NF, an NF module, a link, and a node, or any one of an NF deployment flavor, an NF module deployment flavor, a link deployment flavor, and a node deployment flavor. During creation, configuration, change, and update of the NF instance, a request message received by the NFM may carry a sharing parameter and a rule parameter. During creation, configuration, change, and update of the NF descriptor, a request message received by the NFM carries a sharing parameter and a rule parameter. NF descriptor information received by the NFM includes a sharing parameter of an NF module. In a slice descriptor, sharing parameters of all NFs are specifically set and are associated with a sharing parameter of a slice. The slice descriptor includes a sharing parameter of a network slice, and the sharing parameter of the network slice is mapped to and associated with the sharing parameters of the NFs that are included in the slice descriptor. Slice instance information includes a sharing parameter, and the sharing parameter is mapped to and associated with the sharing parameter in the NF instance information included in the slice instance information. The sharing parameter included in the NF instance information is mapped to and associated with an included release sharing parameter of the NF instance information. The release sharing parameter is used to indicate whether a state of the NF in which the NF can be shared by a plurality of network slices is changed. The sharing parameter included in the NF descriptor is mapped to and associated with an included release sharing parameter in the NF descriptor. During slice sharing, all or some of included NFs may be shared; and during sharing of an NF, all or some of included NF modules may be shared. The sharing parameter includes a parameter indicating whether sharing is to be performed or a rule indicating whether sharing is allowed. The rule includes a threshold value, a calculation method, a monitoring parameter, and the like.

The solutions in the embodiments of the present invention are described above mainly from the perspective of interaction between network elements. It may be understood that to implement the foregoing functions, the network elements, for example, the first management unit and the second management unit, include a corresponding hardware structure and/or a corresponding software module for performing the functions. A person of ordinary skill in the art should easily be aware that, with reference to the examples described in the embodiments disclosed in this specification, units, algorithms steps can be implemented by hardware or a combination of hardware and computer software in the present invention. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the present invention.

In the embodiments of the present invention, the first management unit, the second management unit, and the like may be divided into function module based on the foregoing method examples. For example, the function modules may be obtained through division based on the corresponding functions, or two or more functions may be integrated into one processing module. The integrated module may be implemented in a form of hardware, or may be implemented in a form of a software function module. It should be noted that the module division in the embodiments of the present invention is an example, and is merely logical function division. There may be other division manners in an actual implementation.

Figure 7:
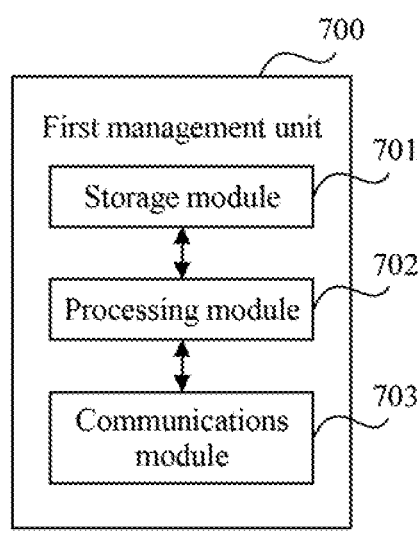
FIG. 7 is a schematic structural diagram of a first management unit according to an embodiment of the present invention.

When an integrated module is used, FIG. 7 is a possible schematic structural diagram of the first management unit in the foregoing embodiments. A first management unit 700 includes a processing module 702 and a communications module 703. The processing module 702 is configured to control and manage an action of the first management unit. For example, the processing module 702 is configured to support the first management unit in performing step 203 in FIG. 2, steps 304, 309, and 310 in FIG. 3A and FIG. 3B, steps 404, 409, and 410 in FIG. 4A and FIG. 4B, steps 501 and 505 in FIG. 5, step 601 in FIG. 6, and/or other steps used in the technology described in this specification. The communications module 703 is configured to support communication between the first management unit and other network entities, for example, communication between the first management unit and a second management unit. The first management unit may further include a storage module 701 that is configured to store program code and data of the first management unit.

The processing module 702 may be a processor or a controller, such as a central processing unit (CPU), a general-purpose processor, a digital signal processor (DSP), an application-specific integrated circuit (ASIC), a field programmable gate array (FPGA) or another programmable logic device, a transistor logic device, a hardware component, or any combination thereof. The controller/processor may implement or execute various example logical blocks, modules, and circuits described with reference to content disclosed in the present invention. Alternatively, the processor may be a combination of processors implementing a computing function, for example, a combination of one or more microprocessors, or a combination of the DSP and a microprocessor. The communications module 703 may be a communications interface, a transceiver, a transceiver circuit, or the like. The communications interface is a collective term and may include one or more interfaces. The storage module 701 may be a memory.

Figure 8:
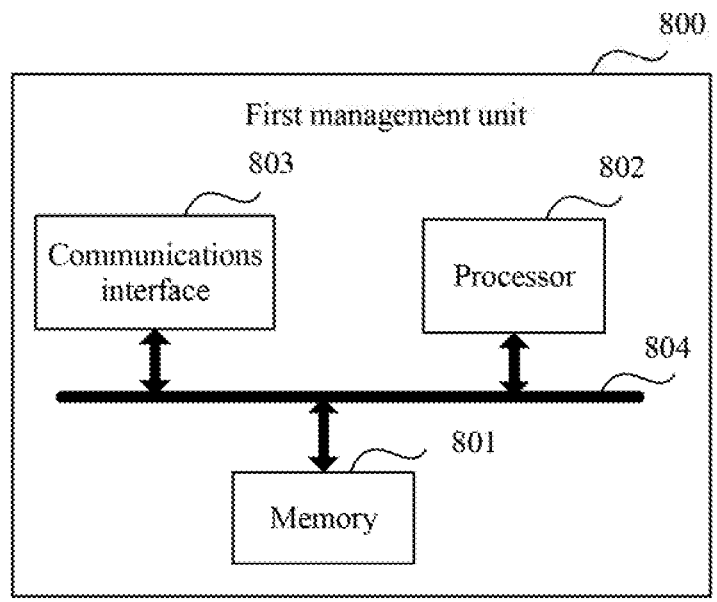
FIG. 8 is a schematic structural diagram of another first management unit according to an embodiment of the present invention.

When the processing module 702 is a processor, the communications module 703 is a communications interface, and the storage module 701 is a memory, the first management unit in the embodiments of the present invention may be a first management unit shown in FIG. 8.

As shown in FIG. 8, the first management unit 800 includes a processor 802, a communications interface 803, and a memory 801. Optionally, the first management unit 800 may further include a bus 804. The communications interface 803, the processor 802, and the memory 801 may be mutually connected by using the bus 804. The bus 804 may be a Peripheral Component Interconnect (Peripheral Component Interconnect, PCI for short) bus, an extended industry standard architecture (EISA) bus, or the like. The bus 804 may be classified into an address bus, a data bus, a control bus, and the like. For ease of representation, only one thick line is used to represent the bus in FIG. 8, but this does not mean that there is only one bus or only one type of bus.

Figure 9:
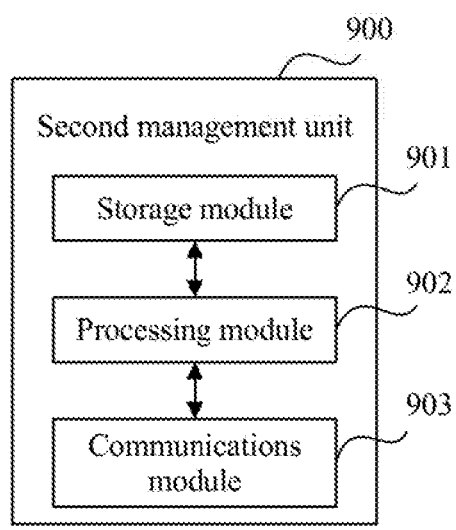
FIG. 9 is a schematic structural diagram of a second management unit according to an embodiment of the present invention.

When an integrated module is used, FIG. 9 is a possible schematic structural diagram of the second management unit in the foregoing embodiments. A second management unit 900 includes a processing module 902 and a communications module 903. The processing module 902 is configured to control and manage an action of the second management unit. For example, the processing module 902 is configured to support the second management unit in performing steps 201 and 202 in FIG. 2, steps 305, 306, 307, and 308 in FIG. 3A and FIG. 3B, steps 405, 406, 407, and 408 in FIG. 4A and FIG. 4B, steps 502, 503, and 504 in FIG. 5, steps 602, 603, 604, and 605 in FIG. 6, and/or other steps used in the technology described in this specification. The communications module 903 is configured to support communication between the second management unit and other network entities, for example, communication between the second management unit and a first management unit. The second management unit may further include a storage module 901 that is configured to store program code and data of the second management unit.

The processing module 902 may be a processor or a controller, such as a CPU, a general-purpose processor, a DSP, an ASIC, an FPGA or another programmable logic device, a transistor logic device, a hardware component, or any combination thereof. The controller/processor may implement or execute various example logical blocks, modules, and circuits described with reference to content disclosed in the present invention. Alternatively, the processor may be a combination of processors implementing a computing function, for example, a combination of one or more microprocessors, or a combination of the DSP and a microprocessor. The communications module 903 may be a communications interface, a transceiver, a transceiver circuit, or the like. The communications interface is a collective term and may include one or more interfaces. The storage module 901 may be a memory.

Figure 10:
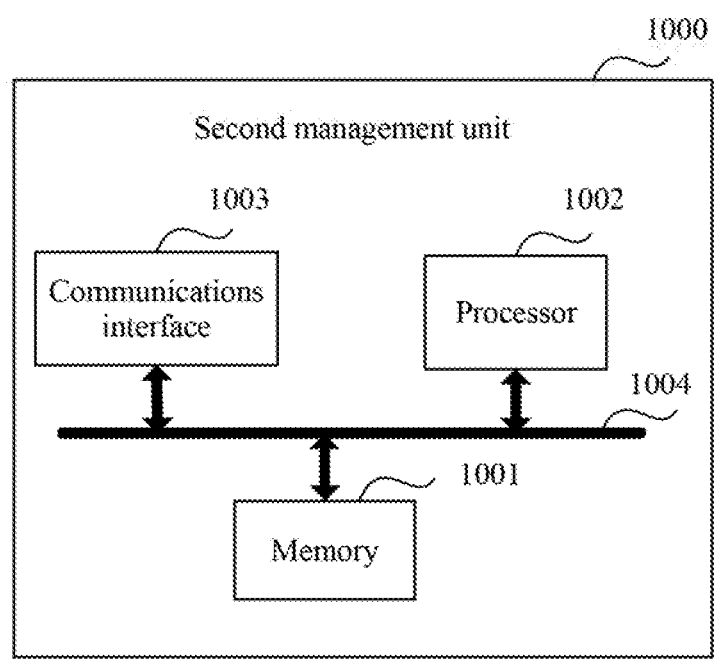
FIG. 10 is a schematic structural diagram of another second management unit according to an embodiment of the present invention.

When the processing module 902 is a processor, the communications module 903 is a communications interface, and the storage module 901 is a memory, the second management unit in the embodiments of the present invention may be a second management unit shown in FIG. 10.

As shown in FIG. 10, the second management unit 1000 includes a processor 1002, a communications interface 1003, and a memory 1001. Optionally, the second management unit 1000 may further include a bus 1004. The communications interface 1003, the processor 1002, and the memory 1001 may be mutually connected by using the bus 1004. The bus 1004 may be a PCI bus, an EISA bus, or the like. The bus 1004 may be classified into an address bus, a data bus, a control bus, and the like. For ease of representation, only one thick line is used to represent the bus in FIG. 10, but this does not mean that there is only one bus or only one type of bus.

Methods or algorithm steps described with reference to the content disclosed in this embodiment of the present invention may be implemented by hardware, or may be implemented by a processor by executing a software instruction. The software instruction may include a corresponding software module. The software module may be stored in a random access memory (RAM), a flash memory, a read-only memory (ROM), an erasable programmable read only memory (EPROM), an electrically erasable programmable read only memory (EEPROM), a register, a hard disk, a removable hard disk, a compact disc read-only memory (CD-ROM), or any other form of storage medium well-known in the art. For example, a storage medium is coupled to a processor, so that the processor can read information from the storage medium or write information into the storage medium. Certainly, the storage medium may be a component of the processor. The processor and the storage medium may be located in the ASIC. In addition, the ASIC may be located in a core network interface device. Certainly, the processor and the storage medium may exist in the core network interface device as discrete components.

A person skilled in the art should be aware that in the foregoing one or more examples, functions described in the embodiments of the present invention may be implemented by hardware, software, firmware, or any combination thereof. When the present invention is implemented by software, these functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a general-purpose or dedicated computer.

In the foregoing specific implementations, the objectives, technical solutions, and benefits of the embodiments of the present invention are further described in detail. It should be understood that the foregoing descriptions are merely specific implementations of the embodiments of the present invention, but are not intended to limit the protection scope of the embodiments of the present invention. Any modification, equivalent replacement, or improvement made based on the technical solutions of the embodiments of the present invention shall fall within the protection scope of the embodiments of the present invention.

What is claimed is:

1. A network function management method comprising:
receiving, by a first management device, sharing information of a network function from a second management device, wherein the sharing information of the network function is used to indicate whether the network function can be shared by at least two network slices; and
orchestrating, by the first management device, the network function based on the sharing information of the network function.

2. The method according to claim 1, wherein before receiving the sharing information of the network function from the second management device, the method further comprises:
sending, by the first management device, a query request message to the second management device, wherein the query request message is used to request the sharing information of the network function; and
wherein receiving sharing information of the network function from the second management device comprises:
receiving, by the first management device, a query response message from the second management device, wherein the query response message carries the sharing information of the network function.

3. The method according to claim 2, wherein the query request message carries an identifier of the network function, an identifier of a network function descriptor, or requirement information of the network function, and
the identifier of the network function, the identifier of the network function descriptor, or the requirement information of the network function is used by the second management device to obtain the sharing information of the network function.

4. The method according to claim 1, wherein before receiving the sharing information of the network function from the second management device, the method further comprises:
sending, by the first management device, a network function instantiation request message to the second management device; and
wherein receiving sharing information of the network function from the second management device comprises:
receiving, by the first management device, a network function instantiation response message from the second management device, wherein the network function instantiation response message carries the sharing information of the network function.

5. The method according to claim 1, wherein before orchestrating the network function based on the sharing information of the network function, the method further comprises:
receiving, by the first management device, a network slice creation request message or a network slice update request message,
wherein a network slice that the network slice creation request message requests to create or a network slice that the network slice update request message requests to update comprises the network function.

6. The method according to claim 1, wherein sharing information of the network function comprises at least one of the following: sharing indication information of the network function, key performance indicator (KPI) information of the network function, or sharing condition information of the network function.

7. A network function management method comprising:
obtaining, by a second management device, sharing information of a network function, wherein the sharing information of the network function is used to indicate whether the network function can be shared by at least two network slices; and
sending, by the second management device, the sharing information of the network function to a first management device, so that the first management device orchestrates the network function.

8. The method according to claim 7, wherein before obtaining the sharing information of the network function, the method further comprises:
receiving, by the second management device, a query request message from the first management device, wherein the query request message is used to request the sharing information of the network function; and
wherein sending the sharing information of the network function to the first management device comprises:
sending, by the second management device, a query response message to the first management device, wherein the query response message carries the sharing information of the network function.

9. The method according to claim 8, wherein the query request message carries an identifier of the network function, an identifier of a network function descriptor, or requirement information of the network function; and
wherein obtaining the sharing information of the network function comprises:
obtaining, by the second management device, the sharing information of the network function based on the identifier of the network function, the identifier of the network function descriptor, or the requirement information of the network function.

10. The method according to claim 7, wherein the sharing information of the network function comprises at least one of the following: sharing indication information of the network function, key performance indicator (KPI) information of the network function, or sharing condition information of the network function.

11. A first management device comprising:
a processor; and
a memory coupled to the processor and having program instructions stored thereon which, when executed by the processor, cause the apparatus to perform operations comprising:
receiving sharing information of a network function from a second management device, wherein the sharing information of the network function is used to indicate whether the network function can be shared by at least two network slices; and
orchestrating the network function based on the sharing information of the network function.

12. The first management device according to claim 11, wherein the operations further comprising:
sending, before receiving the sharing information of the network function from the second management device, a query request message to the second management device, wherein the query request message is used to request the sharing information of the network function; and
receiving a query response message from the second management device, wherein the query response message carries the sharing information of the network function.

13. The first management device according to claim 12, wherein the query request message carries an identifier of the network function, an identifier of a network function descriptor, or requirement information of the network function, and the identifier of the network function, the identifier of the network function descriptor, or the requirement information of the network function is used by the second management device to obtain the sharing information of the network function.

14. The first management device according to claim 11, wherein the operations further comprising:
sending, before receiving the sharing information of the network function from the second management device, a network function instantiation request message to the second management device; and
receiving a network function instantiation response message from the second management device, wherein the network function instantiation response message carries the sharing information of the network function.

15. The first management device according to claim 11, wherein the operations further comprising:
receiving, before orchestrating the network function based on the sharing information of the network function, a network slice creation request message or a network slice update request message, wherein a network slice that the network slice creation request message requests to create or a network slice that the network slice update request message requests to update comprises the network function.

16. The first management device according to claim 11, wherein the sharing information of the network function comprises at least one of the following: sharing indication information of the network function, key performance indicator (KPI) information of the network function, or sharing condition information of the network function.

17. A second management device comprising:
a processor; and
a memory coupled to the processor and having program instructions stored thereon which, when executed by the processor, cause the apparatus to perform operations comprising:
obtaining sharing information of a network function, wherein the sharing information of the network function is used to indicate whether the network function can be shared by at least two network slices; and
sending the sharing information of the network function to a first management device.

18. The second management device according to claim 17, wherein the operations further comprising:
receiving, before obtaining the sharing information of the network function, a query request message from the first management device, wherein the query request message is used to request the sharing information of the network function; and
sending a query response message to the first management device, wherein the query response message carries the sharing information of the network function.

19. The second management device according to claim 18, wherein the query request message carries an identifier of the network function, an identifier of a network function descriptor, or requirement information of the network function, and the operation of obtaining sharing information of a network function comprises:
obtaining the sharing information of the network function based on the identifier of the network function, the identifier of the network function descriptor, or the requirement information of the network function.

20. The second management device according to claim 17, wherein the sharing information of the network function comprises at least one of the following: sharing indication information of the network function, key performance indicator (KPI) information of the network function, or sharing condition information of the network function.

* * * * *